US008933800B1

(12) United States Patent
Biles

(10) Patent No.: US 8,933,800 B1
(45) Date of Patent: Jan. 13, 2015

(54) THIRD BRAKE LIGHT ACCESSORY FOR USE WITH A CLASSIC CAR

(76) Inventor: Tommy Rex Biles, Huntsville, AL (US)

( * ) Notice: Subject to any disclaimer, the term of this patent is extended or adjusted under 35 U.S.C. 154(b) by 221 days.

(21) Appl. No.: 13/545,086

(22) Filed: Jul. 10, 2012

(51) Int. Cl.
  *B60Q 1/34* (2006.01)
(52) U.S. Cl.
  CPC ...................................... *B62Q 1/302* (2013.01)
  USPC ............................ 340/475; 340/468; D26/32
(58) Field of Classification Search
  CPC ............ B60Q 1/30; B60Q 1/302; B60Q 1/44; B60Q 1/46
  USPC .......................... 340/475, 468, 471, 472, 479; D26/28–36, 73
  See application file for complete search history.

(56) References Cited

U.S. PATENT DOCUMENTS

| 3,784,974 | A | | 1/1974 | Hamashige | |
|---|---|---|---|---|---|
| D308,113 | S | * | 5/1990 | Lewis, Jr. | .................. D26/73 |
| 4,954,808 | A | | 9/1990 | Duerkob | |
| D313,661 | S | | 1/1991 | Kang | |
| 5,073,768 | A | | 12/1991 | Willaredt | |
| D324,740 | S | * | 3/1992 | Harder | ........................ D26/32 |
| 5,663,706 | A | | 9/1997 | Francis | |
| 5,966,073 | A | | 10/1999 | Walton | |
| 6,181,243 | B1 | * | 1/2001 | Yang | ........................... 340/468 |
| D451,216 | S | | 11/2001 | Huffman | |
| 6,952,162 | B2 | | 10/2005 | Monck et al. | |
| D513,538 | S | | 1/2006 | Behm | |
| D586,936 | S | * | 2/2009 | Nunes | ........................ D26/73 |

* cited by examiner

*Primary Examiner* — John A Tweel, Jr.
(74) *Attorney, Agent, or Firm* — Kyle A. Fletcher, Esq.

(57) ABSTRACT

The third brake light accessory for use with a classic car includes a housing that resembles the front end or grille of a classic car, and which is placed against an inner surface of a rear window to operate as a third brake light. The third brake light accessory may further include turn signal lights that work in conjunction with the turn signal lights of the respective vehicle. The third brake light accessory is ideally designed for use with a particular make and model of a classic car, and which has a housing resembling the front portion of or grille of the respective vehicle, while acting as a third brake light.

19 Claims, 3 Drawing Sheets

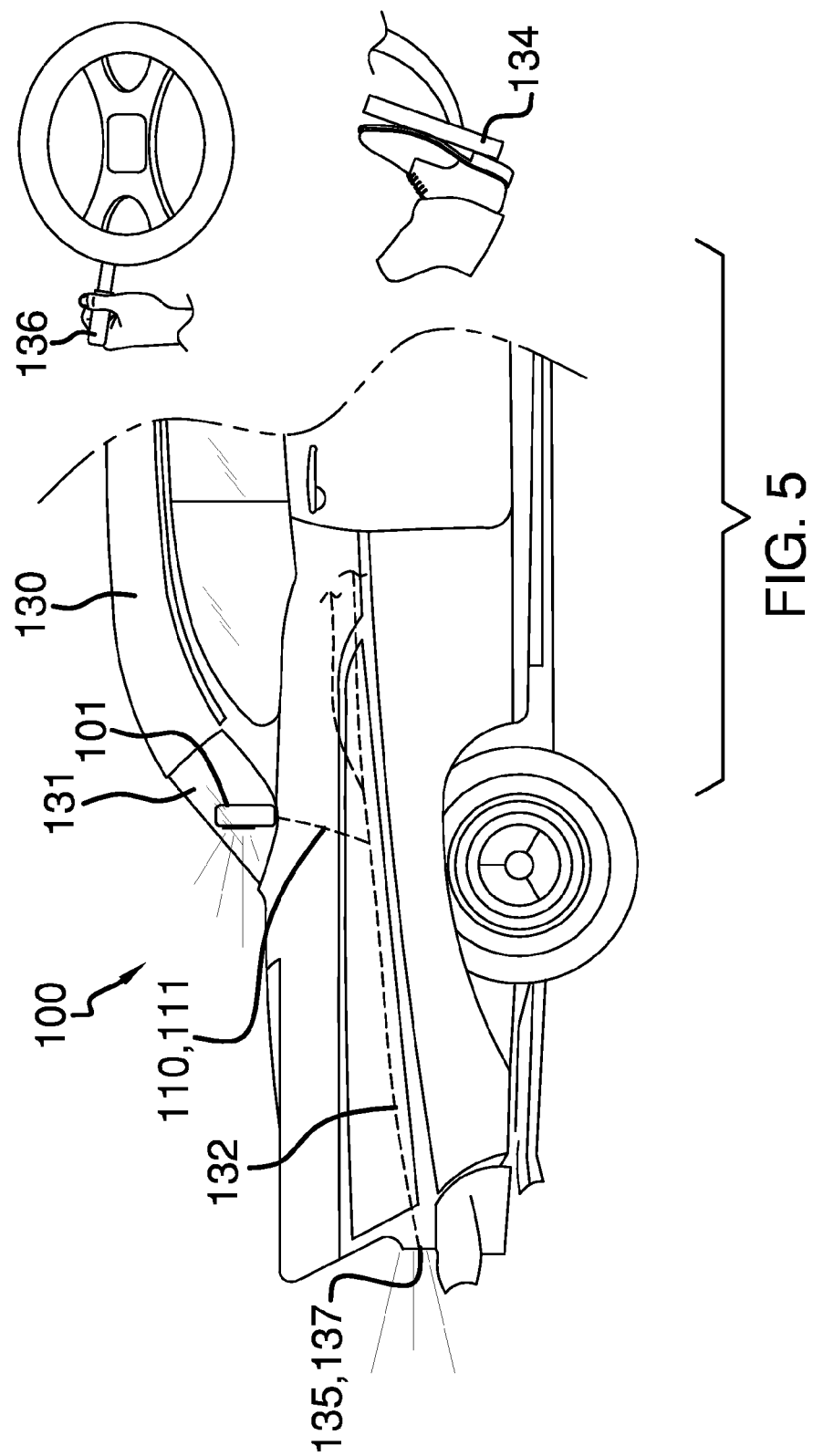

THIRD BRAKE LIGHT ACCESSORY FOR USE WITH A CLASSIC CAR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of third brake lights, more specifically, an accessory for placement against an inner surface of a rear window of an antique, vintage, or classic car, which acts as a third brake light, and resembling the front end of the respective car.

Vintage cars, classic cars, antique cars are all collector's items that can fetch large prices when kept in cherry condition. The range of these cars collectively is quite significant when you take into consideration the various styles and models of cars that have evolved over the last 80 to 90 years.

Vintage, classic, and antique cars are important to preserve the history of the automobile, and can be seen on the open road. A vintage car is commonly known as a vehicle that was that was produced between 20 and 40 years. Moreover, an antique car is commonly defined as a car that was manufactured over 45 years ago. For reasons of simplicity, the term classic car will be used hereinafter to include antique and vintage cars as well.

A small problem with actually driving classic cars on the open road is the lack of safety features that are a requirement of a newly produced vehicle of today. Of the multitude of standardized features of a newly produced vehicle of today is the inclusion of a third brake light. Since 1986, the third brake light is a required feature of a newly produced vehicle.

Since a typical classic car does not have a third brake light, a collector may want to install one in order to make the classic car more visible to motorists traveling behind the classic car. The only drawback to installing a third brake light onto a classic car is that the third brake light may detract from the overall appearance and authenticity of the respective car.

The device of the present application seeks to address the need of outfitting a classic car with a third brake light by introducing the third brake light in a housing that resembles a front end or grille of a respective classic car.

B. Discussion of the Prior Art

As will be discussed immediately below, no prior art discloses a third brake light that is an accessory for use against an inner surface of a rear window of a classic car; wherein the accessory resembles a front end or grille of a classic car, and is optionally used within the respective classic car so as to provide an ornamental effect to said classic car; wherein the third brake light includes wiring that connects with the existing brake lights of the classic car, and which illuminates the third brake light of the accessory upon depression of the brake pedal by the driver; wherein the accessory may optionally include turn lights that function in conjunction with the turn lights of the classic car.

The Walton Patent (U.S. Pat. No. 5,966,073) discloses a vehicle with front and side mounted brake and running turn signal lights. However, the lights are integrated into the construction of the respective vehicle, and are not a part of an accessory that is placed inside of an existing vehicle, and used as an accessory resembling the front end of a classic car.

The Hamashige Patent (U.S. Pat. No. 3,784,974) discloses a driver's communication signal that visually indicates whether the vehicle is accelerating, braking, or turning. However, the communication signal is not an accessory that is placed against an inner surface of a rear window, and which resembles the front end or grille off of a classic car.

The Kang Patent (U.S. Pat. No. Des. 313,661) illustrates an ornamental design for a combined auxiliary vehicle brake signal light and turn signal. The signal light and turn signal does not resemble the front end or grille of a classic car.

The Monck et al. Patent (U.S. Pat. No. 6,952,162) discloses a multi-directional clustered signal light system for a motor vehicle that is incorporated on opposing sides of a vehicle's front and rear bumpers. Again, the system is used on opposing sides of a front and rear bumper, and is not an accessory placed against an inner surface of a rear window. Moreover, the system does not give the appearance of a front end or grille of a classic car.

The Francis Patent (U.S. Pat. No. 5,663,706) discloses an automotive vehicle alert system for indicating changes in vehicle operation mode. However, the automotive vehicle alert system does not resemble the front end or grille off of a classic car, and is not placed against an inner surface of a rear window to act as a 3rd brake light for a classic car.

The Willaredt Patent (U.S. Pat. No. 5,073,768) discloses auxiliary signal lights for a vehicle. Again, the signal lights do not have the appearance of a front end or grille off of a classic car, and acts as a third brake light by being placed against an inner surface of a rear window of a vehicle.

The Duerkob Patent (U.S. Pat. No. 4,954,808) discloses an eye level rear mounted light for turn and stop signal for motor vehicles. Again, the light is not an accessory that resembles the front end or grille off of a classic car, and which is placed against an inner surface of a rear window to provide a third brake light and/or turn signal accessory for use with a respective classic car.

While the above-described devices fulfill their respective and particular objects and requirements, they do not describe a third brake light that is an accessory for use against an inner surface of a rear window of a classic car; wherein the accessory resembles a front end or grille of a classic car, and is optionally used within the respective classic car so as to provide an ornamental effect to said classic car; wherein the third brake light includes wiring that connects with the existing brake lights of the classic car, and which illuminates the third brake light of the accessory upon depression of the brake pedal by the driver; wherein the accessory may optionally include turn lights that function in conjunction with the turn lights of the classic car. In this regard, the third brake light accessory for use with a classic car departs from the conventional concepts and designs of the prior art.

SUMMARY OF THE INVENTION

The third brake light accessory for use with a classic car includes a housing that resembles the front end or grille of a classic car, and which is placed against an inner surface of a rear window to operate as a third brake light. The third brake light accessory may further include turn signal lights that work in conjunction with the turn signal lights of the respective vehicle. The third brake light accessory is ideally designed for use with a particular make and model of a classic car, and which has a housing resembling the front portion of or grille of the respective vehicle, while acting as a third brake light. The third brake light is wired to the brake light wiring of the vehicle such that upon depression of the brake pedal, the third brake light illuminates in conjunction with the brake lights of the respective vehicle.

An object of the invention is to provide an accessory for use with a classic car, which resembles the front end or grille off of the classic car, but also acts as a third brake light when wired to the brake light wiring of the respective vehicle.

A further object of the invention is to provide an accessory that is placed against an inner surface of a rear window, and when wired to the appropriate wiring shall provide a third brake light for the classic vehicle.

An even further object of the invention is to optionally include turn signal lights on the accessory that are wired to the turn signal lights of the classic vehicle.

A further object of the invention is to provide an accessory that has an appearance that is true of the respective classic car, and which offers a third brake light in order to improve the overall safety of the respective vehicle without detracting from the appearance of the vehicle.

A further object of the invention is to provide a housing that can be constructed to resemble one of a plurality of front ends or grilles of a vast multitude of classic cars, which may not have a third brake light.

These together with additional objects, features and advantages of the third brake light accessory for use with a classic car will be readily apparent to those of ordinary skill in the art upon reading the following detailed description of presently preferred, but nonetheless illustrative, embodiments of the third brake light accessory for use with a classic car when taken in conjunction with the accompanying drawings.

In this respect, before explaining the current embodiments of the third brake light accessory for use with a classic car in detail, it is to be understood that the third brake light accessory for use with a classic car is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the third brake light accessory for use with a classic car.

It is therefore important that the claims be regarded as including such equivalent construction insofar as they do not depart from the spirit and scope of the third brake light accessory for use with a classic car. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 2 illustrates a bottom view of the housing in which wiring exits there from;

FIG. 5 illustrates a side view of the third brake light accessory installed and in use with the 1957 Chevy, and further detailing the illumination of either brake lights or turn signal lights of the accessory in conjunction with the brake or turn signal lights of the 1957 Chevy.

DETAILED DESCRIPTION OF THE EMBODIMENT

Figure 1:
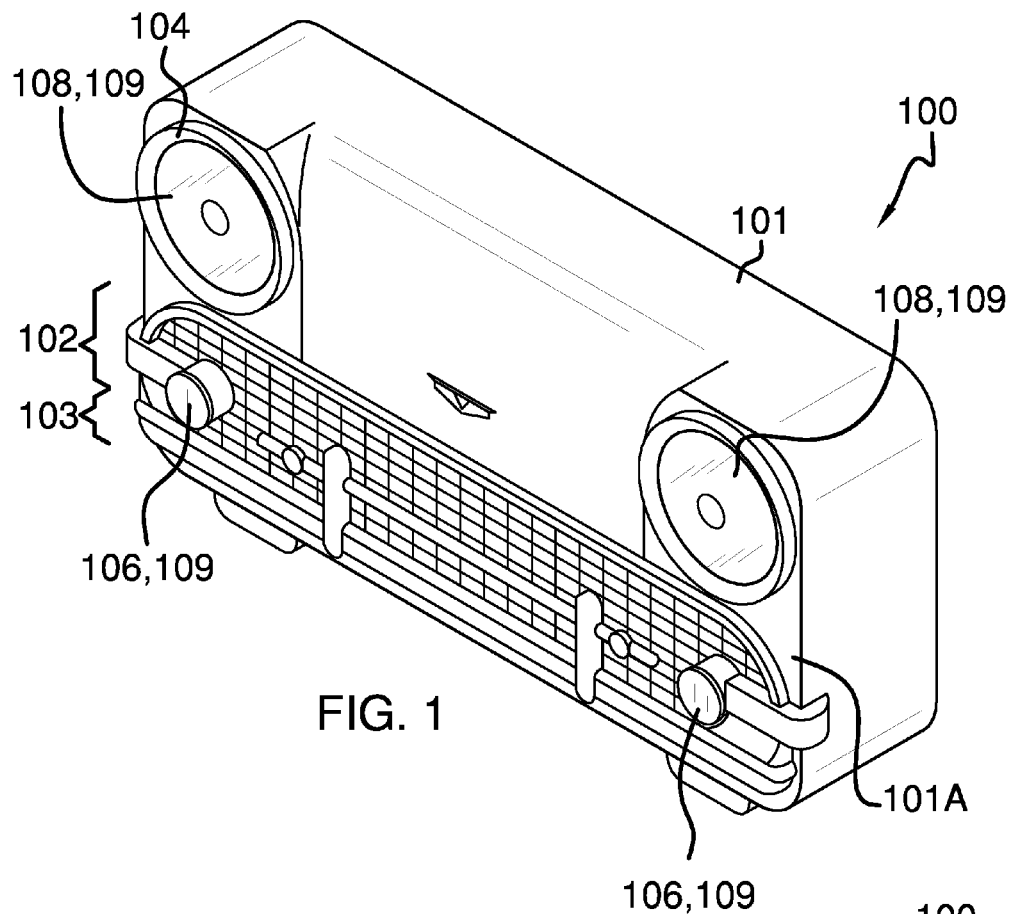
FIG. 1 illustrates a perspective view of the housing that encompasses the third brake light accessory, and which resembles a front end off of a 1957 Chevy.
Figure 2:
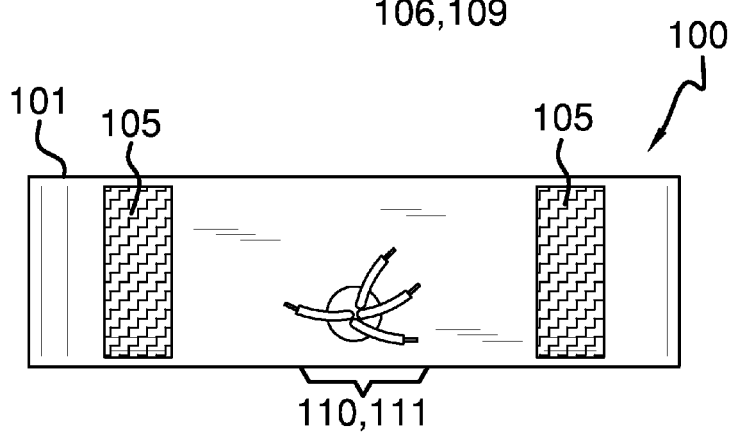
Figure 3:
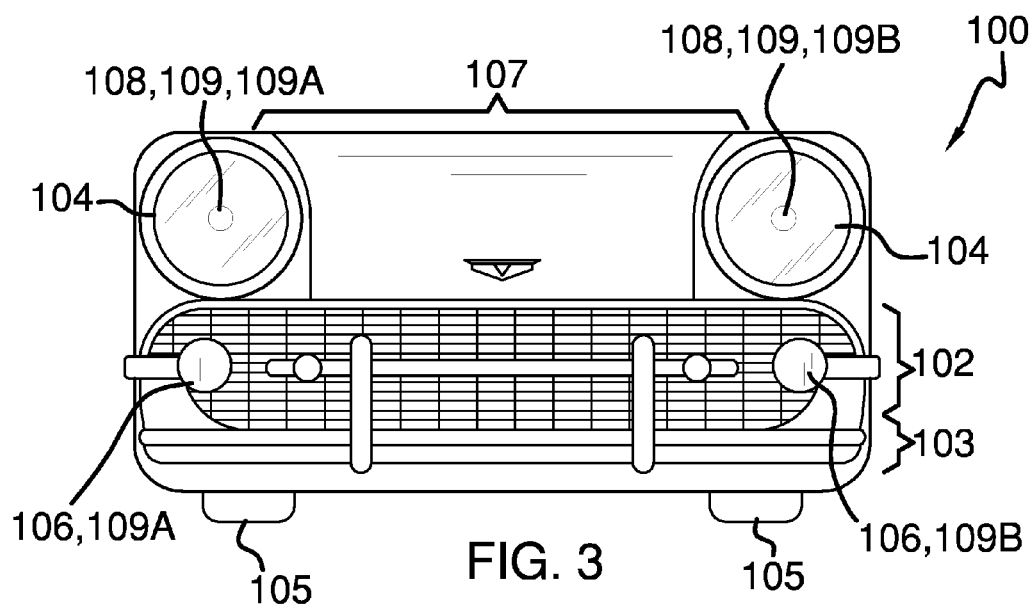
FIG. 3 illustrates a front view of the housing with more detail as to the third brake light located in the central portion whereas turn signal lights are located in place of the headlights of the housing resembling the front end of the 1957 Chevy.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-5. A third brake light accessory for use with a classic car 100 (hereinafter invention) includes a housing 101 that is of hollowed construction, and resembling a front end or grille off of a classic car. It shall be noted that the housing 101 may be adapted to resemble any of a multitude of classic cars, and which term is being used to include vintage cars, antique cars, and classic cars. Moreover, the housing 101 shall resemble the front end of the respective classic car of use, and shall include a grille 102, a front bumper 103, headlights 104, exposed portion of wheels 105, turn signals 106, and a central emblem region 107.

The housing 101 can be produced from a multitude of different materials comprising a plastic, metal, wood, or carbon fiber composite. The housing 101 shall be outfitted with a third brake light 108 that encompasses the locations of the headlights 104. The third brake light 108 being located on either side of the central emblem region 107 which occupies a central, top portion of a rear surface 101A of the housing 101. Moreover, the third brake light 108 may include at least one light emitting diode or incandescent bulb that is wired to a brake light wiring 133 of a respective classic car 130.

It shall be further noted that the housing 101 is to be placed against an inner surface of a rear window 131 of the classic car 130. The housing 101 may optionally include housing turn signal lights 109 that are placed at the location of the headlights 104 and/or turn signals 106. Moreover, the housing turn signal lights 109 and the third brake light 108 are one and the same. They are one and the same, but provide different functions when in use with the invention 100. The third brake light 108 illuminates when a brake pedal 134 of the classic car 130 is depressed, whereas the housing turn signal lights 109 illuminate when a turn signal 137 of the classic car 130 is utilized. Moreover, the housing turn signal lights 109 shall include turn wiring 110 that extends from the housing 101 and connects with vehicle turn signal wiring 132 of the classic car 130.

The third brake light 108 includes brake wiring 111 that extends from the housing 101 and connects with vehicle brake signal wiring 133 of the classic car 130 such that upon depression of the brake pedal 134 (see FIG. 5), the third brake light 108 shall illuminate in conjunction with brake lights 135 of the classic car.

Moreover, the use of a turn signal lever 136 of the classic car 130 (see FIG. 5) shall illuminate a respective housing turn signal light 109 on the housing 101, and in conjunction with a vehicle turn signal 137 of the classic car 130.

Figure 4:
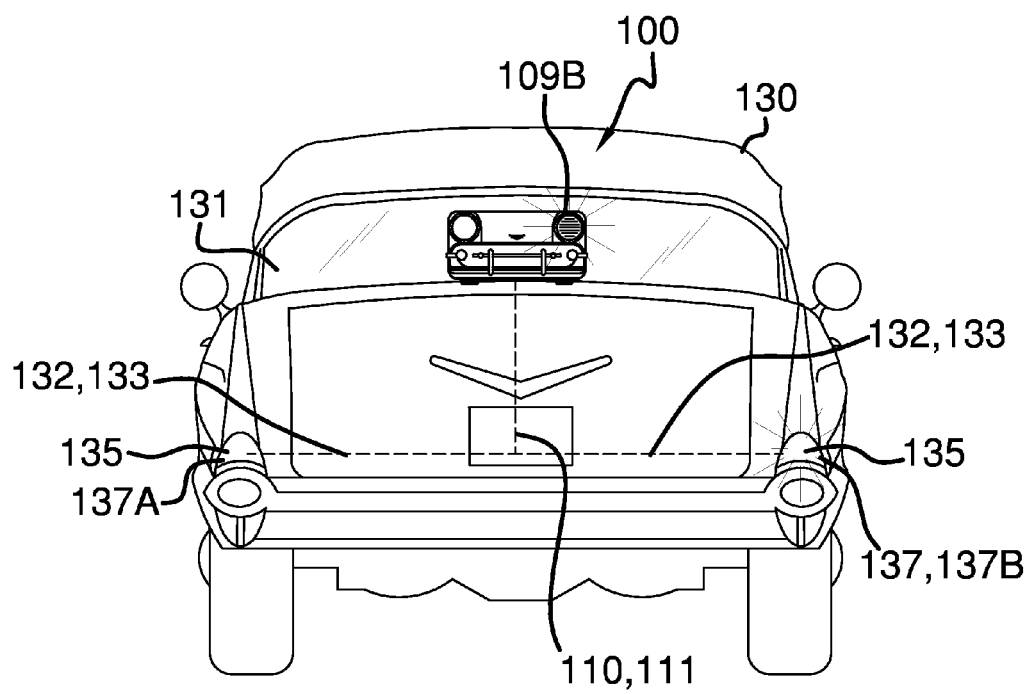
FIG. 4 illustrates a rear view of the third brake light accessory installed inside and against an inner surface of a rear window of a 1957 Chevy, and further detailing the wiring that extends to the several turn signal and brake lights of the respective vehicle, and illumination of the turn signal of the car and on the housing.

Referring to FIGS. 4 and 5, the invention 100 is currently depicted with illumination of the housing turn signal light 109 on the housing 101 that corresponds with the respective turn signal 137 of the vehicle 130. It shall be noted that the turn signal 137 may be further defined as a left turn signal 137A and signal lights 109 may be further defined as a left housing turn signal light 109A and a right housing turn signal light 109B.

FIGS. 4 and 5 depicts use of the invention 100 with turn signals. However, it is hereby being asserted that the third brake light 108 illuminates in conjunction with and simultaneously with the brake lights 135 of the classic car 130 via depression of the brake pedal 134.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A third brake light accessory for use with a classic car comprising:
   a housing resembling a front end of a classic car, which is placed against an inner surface of a rear window of a classic car;
   wherein a third brake light is included within said housing, and is wired to a brake signal wiring of said respective classic car such that upon depression of a brake pedal, the third brake light and brake lights of the classic car illuminate;
   wherein housing turn signal lights are included with said housing, and is wired to vehicle turn signal wiring such that upon use of a turn signal lever of said classic car, the respective turn signal light and corresponding vehicle turn signal shall illuminate conjunctively;
   wherein the housing includes a grille, front bumper, headlights, exposed portion of wheels, turn signals, and a central emblem region.

2. The third brake light accessory for use with a classic car as described in claim 1 wherein the headlights of the housing facilitate the location of the third brake light.

3. The third brake light accessory for use with a classic car as described in claim 2 wherein the third brake light is comprised of at least one light emitting diode or incandescent bulb.

4. The third brake light accessory for use with a classic car as described in claim 3 wherein brake wiring extends from the third brake light inside of said housing to said brake signal wiring of said classic car.

5. The third brake light accessory for use with a classic car as described in claim 2 wherein the housing turn signal lights occupy the respective headlights of the housing along with the third brake light.

6. The third brake light accessory for use with a classic car as described in claim 5 wherein the housing turn signal lights include turn wiring that extends from the housing and connects with vehicle turn signal wiring.

7. The third brake light accessory for use with a classic car as described in claim 6 wherein the housing turn signal lights are further defined as a left housing turn signal light and a right housing turn signal light; wherein the left housing turn signal light is wired to a left turn signal of the classic car; wherein the right housing turn signal is wired to a right turn signal of the classic car.

8. A third brake light accessory for use with a classic car comprising:
   a housing resembling a front end of a classic car, which is placed against an inner surface of a rear window of a classic car;
   wherein a third brake light is included within said housing, and is wired to a brake signal wiring of said respective classic car such that upon depression of a brake pedal, the third brake light and brake lights of the classic car illuminate;
   wherein housing turn signal lights are included with said housing, and is wired to vehicle turn signal wiring such that upon use of a turn signal lever of said classic car, the respective turn signal light and corresponding vehicle turn signal shall illuminate conjunctively;
   wherein the housing includes a grille, front bumper, headlights, exposed portion of wheels, turn signals, and a central emblem region.

9. The third brake light accessory for use with a classic car as described in claim 8 wherein the headlights of the housing facilitate the location of the third brake light.

10. The third brake light accessory for use with a classic car as described in claim 9 wherein the third brake light is comprised of at least one light emitting diode or incandescent bulb.

11. The third brake light accessory for use with a classic car as described in claim 10 wherein brake wiring extends from the third brake light inside of said housing to said brake signal wiring of said classic car.

12. The third brake light accessory for use with a classic car as described in claim 8 wherein the housing turn signal lights occupy the respective headlights of the housing along with the third brake light; wherein the housing turn signal lights also occupy the turn signals of the housing.

13. The third brake light accessory for use with a classic car as described in claim 12 wherein the housing turn signal lights include turn wiring that extends from the housing and connects with vehicle turn signal wiring.

14. The third brake light accessory for use with a classic car as described in claim 13 wherein the housing turn signal lights are further defined as a left housing turn signal light and a right housing turn signal light; wherein the left housing turn signal light is wired to a left turn signal of the classic car; wherein the right housing turn signal is wired to a right turn signal of the classic car.

15. A third brake light accessory for use with a classic car comprising:
- a housing resembling a front end of a classic car, which is placed against an inner surface of a rear window of a classic car;
- wherein a third brake light is included within said housing, and is wired to a brake signal wiring of said respective classic car such that upon depression of a brake pedal, the third brake light and brake lights of the classic car illuminate;
- wherein the housing includes a grille, front bumper, headlights, exposed portion of wheels, turn signals, and a central emblem region.

16. The third brake light accessory for use with a classic car as described in claim 15 wherein housing turn signal lights are included with said housing, and are wired to vehicle turn signal wiring such that upon use of a turn signal lever of said classic car, the respective turn signal light and corresponding vehicle turn signal shall illuminate conjunctively.

17. The third brake light accessory for use with a classic car as described in claim 16 wherein the housing turn signal lights occupy the respective headlights of the housing along with the third brake light; wherein the housing turn signal lights also occupy the turn signals of the housing; wherein the housing turn signal lights include turn wiring that extends from the housing and connects with vehicle turn signal wiring.

18. The third brake light accessory for use with a classic car as described in claim 17 wherein the housing turn signal lights are further defined as a left housing turn signal light and a right housing turn signal light; wherein the left housing turn signal light is wired to a left turn signal of the classic car; wherein the right housing turn signal is wired to a right turn signal of the classic car.

19. The third brake light accessory for use with a classic car as described in claim 15 wherein the headlights of the housing facilitate the location of the third brake light; wherein brake wiring extends from the third brake light inside of said housing to said brake signal wiring of said classic car.

* * * * *